United States Patent [19]

Adler-Nissen

[11] 4,100,151

[45] Jul. 11, 1978

[54] ENZYMATIC MODIFICATION OF CORN GLUTEN

[75] Inventor: Jens Lorenz Adler-Nissen, Copenhagen, Denmark

[73] Assignee: Novo Industri A/S, Bagsvaerd, Denmark

[21] Appl. No.: 757,330

[22] Filed: Jan. 6, 1977

[30] Foreign Application Priority Data

Jan. 12, 1976 [GB] United Kingdom ................ 1090/76

[51] Int. Cl.$^2$ ............................ A23J 1/16; A23J 1/12
[52] U.S. Cl. ................................. 260/112 G; 195/29; 426/18; 426/52; 426/53
[58] Field of Search ................ 195/29, 4; 426/18, 44, 426/52, 53; 260/112 G

[56] References Cited

U.S. PATENT DOCUMENTS 3,846,560  11/1974  Hempenius et al. .................. 426/18
3,876,806  4/1975  Hempenius et al. .................. 426/46

OTHER PUBLICATIONS

Chiang et al., Chemical Abstracts, vol. 78, 1973, 27916a.

Primary Examiner—Lionel M. Shapiro
Attorney, Agent, or Firm—Fidelman, Wolffe & Waldron

[57] ABSTRACT

Modification of corn gluten by proteolytic hydrolysis, preferably by a microbial proteinase, of an aqueous corn gluten suspension substrate concentration above about 6% w/w based on protein dry matter with an enzyme concentration of 0.05 – 0.5 Anson units/liter. The hydrolysis being conducted until viscosity of the suspension exceeds about 50 cp., whereafter the enzyme is deactivated.

Preferred proteinases are those derived from *B. subtilis* and *B. licheniformis*.

The modified corn gluten is novel.

8 Claims, 8 Drawing Figures

ENZYMATIC MODIFICATION OF CORN GLUTEN

THE INVENTION

The present invention relates to proteolytic treatment of corn gluten and to the modified corn gluten.

Corn gluten, herein considered as identical to a concentrate of maize protein, appears as a by-product from the wet milling process for production of maize starch. Corn gluten is predominately used as animal feed; but it can also be used as a cork binding agent, as an additive for printing dyes in the pharmaceutical field, and for other purposes. It would also be desirable to use corn gluten for human food, but the properties of unmodified corn gluten are not ideal for this purpose.

Thus, due to its unbalanced amino acid pattern, corn gluten is not very suitable as a portein source in human nutrition; however, mixing corn gluten with soy protein (which is deficient in methionine) produces a product, superior in nutritional qualities both to soy protein and maize protein. The practical use of corn gluten in human food has been limited by the fact that the proteins in corn gluten are largely insoluble in water. In fact, the gritty mouth-feel experienced upon ingestion of corn gluten is ascribed to its pronounced insolubility. It liquid or semi-solid feed preparations, the corn gluten will settle out like fine sand. Raw corn gluten has an unsatisfactory extrusion capability, consistent with the fact that it also has a low water absorption capability. The gluten forms a two-phase system if suspended in an aqueous medium and then left alone.

According to the present invention, it has now been found that it is possible to treat raw corn gluten in a simple way so that the characteristics of corn gluten will be modified significantly in the following ways:

(1) the water absorption capability will be significantly improved, and (2) the modified corn gluten will form a one-phase system if suspended in an aqueous medium and then left alone.

Specifically the present process involves modifying corn gluten by proteolytic treatment, and comprises suspending corn gluten in an aqueous medium to a protein dry matter concentration above about 6% w/w, and treating the corn gluten suspension with a proteolytic enzyme in concentration of between about 0.05 Anson units/l and about 0.5 Anson units/l. The treatment conditions should be close to optimum for the enzyme, i.e., at a pH between about 0.5 pH unit below the pH activity optimum of the proteolytic enzyme and about 1.5 pH units above the pH activity optimum of the proteolytic enzyme and at a temperature between about 10° C below the temperature optimum and the temperature, optimum, until the viscosity reaches a value of about 50 cP (centipoise) or above. The corn gluten to be modified according to the invention is introduced into the process as a flour having the particle size usual to vegetable flour.

The corn gluten protein dry matter referred to above is calculated as the percentage of nitrogen, measured according to Kjeldahl, multiplied by 6.25. The concentration of protein dry matter in the suspension should be higher than about 6% w/w, since no satisfactory viscosity change is obtained with corn gluten suspensions containing protein dry matter concentrations below about 6% w/w. The upper limit for the concentration of protein dry matter is a practical limit, being dependent upon the mixing apparatus available. A powerful kneader for instance allows a higher maximum concentration of protein dry matter than a simple propeller mixer.

The enzyme activity unit referred to above in terms of Anson units is determined according to the modified Anson method described in NOVO enzyme information IB no. 058 e-GB (the original Anson method is described in Journal of General Physiology, 22, 79-89 (1939)).

The enzyme activity is important: If the enzyme activity is lower than 0.05 Anson units/l, the corn gluten will not be modified satisfactorily which consequence is indicated by low viscosity. If the enzyme activity is higher than 0.5 Au/l, the taste of the modified corn gluten will be bitter.

The pH activity optimum referred to above is determined according to the above-described modified Anson method, which of course is further modified in that a series of substrates in buffers with different pH values is prepared and analyzed in order to establish the pH activity curve and the maximum thereof, corresponding to the pH activity optimum.

The pH, during the hydrolysis, drops if no alkali is added; but the pH can be kept constant by means of a pH-stat.

The temperature optimum (for the enzyme), referred to above, is determined according to the above-described modified Anson method (reaction time 10 minutes), which of course is further modified in that a series of substrates are incubated at different temperatures and analyzed in order to establish the temperature activity curve and the maximum thereof, the corresponding temperature being the temperature optimum.

The viscosity is measured at 15° C on a rotational viscosimeter with an internal, rotating cylinder. Except as otherwise indicated, the viscosity is measured at a constant shear rate of 441 sec$^{-1}$. The viscosity was measured on an aqueous suspension with a 6.0% w/w concentration of dry protein, calculated as N $\times$ 6.25. The concentration of 6% w/w is obtained by diluting the sample (with a substrate concentration higher than 6% w/w) with the appropriate amount of distilled water. It has been found that the viscosity increases during hydrolysis which may be rather surprising, as a hydrolysis whereby small molecular fragments are formed usually is giving rise to a decrease in viscosity.

In order to avoid further action of the proteolytic enzyme after the treatment of the corn gluten according to the invention, which could cause a bitter taste in the modified corn gluten, the protelytic activity is inactivated. This inactivation can be performed in any known manner, e.g., by heat treatment or pH adjustment. This inactivation is most easily carried out as a heat inactivation during the extrusion together with the soy protein when such a mixed product is made.

A preferred embodiment of the treatment, according to the invention, comprises the use of proteolytic enzymes from microbial sources, notably from *B. subtilis* or *B. licheniformis*. In this way, a cheap process is provided. In the examples which follow, three different microbial proteases are illustrated: viz. ALCALASE ®, which is a protease produced by means of *Bacillus licheniformis;* NEUTRASE ®, which is a protease containing a neutral and an alkaline constituent and originating from *Bacillus subtilis;* and SP 99, which is a preparation containing the neutral constituent of NEUTRASE ®. All three enzyme preparations exhibited a proteolytic activity of 1.5 Anson units/g.

A preferred embodiment of the protelytic treatment according to the invention comprises the use of microbial proteases with a pH optimum around neutrality. By doing so, a suspension with high water absorption capacity is obtained. This is advantageous for the application of the modified corn gluten as a starting material for textured vegetable protein. Additionally, no major pH-adjustment is necessary, either during the hydrolysis or subsequent thereto.

A preferred embodiment of the process according to the invention comprises a hydrolysis, where the viscosity reaches a value of about 100 cP or above. Thereby a suspension with improved water absorption capability is obtained.

Also the invention encompasses the modified corn gluten formed by the process herein described.

Due to its excellent water absorption capability and its ability to form a stable one-phase system, the suspension of corn gluten modified by practice of the present invention has utility in the field of vegetable textured proteins. In this field, the so-called functional properties of the proteins are important, the water absorption capability being one such functional property. The functional properties of proteins are defined as "those (properties) which contribute some performance aspect, especially on manipulation in aqueous dispersion, to affect structure and texture of the formulation favourably" (Circle, S. J., Smith, A. K., in Smith, A. K. Circle, S. J. (edit), "Soybeans: Chemistry and Technology", Vol. 1, pp 327-328, Avi Publishing Comp., Westport, Conn., United States of America, 1972).

After inactivation, the suspension of modified corn gluten may be further procesed into finished foods; for example, human foods by admixture with soy protein, as has been mentioned above. Thus, the suspension may be mixed with soy protein, whereafter the mixture is extruded, the proteolytic activity being inactivated during the extrusion, then further processed into finished foods. The suspension also may be transformed to a stable powder by drying, preferably by spray drying, vacuum drying or drum drying, desirably after heat inactivation of the proteinase.

As has already been mentioned, one of the advantages of the modified corn gluten according to the invention is the improved water absorption capability and the concomitant improved extrusion capability and encreased tendency to form a single phase system. The water absorption capability, the extrusion capability and the tendency to form a single phase system are not very easily measured. However, it has been found that the tendency to form a single phase system is high in case the viscosity is high. Thus the viscosity which is easily measured is an indication of both water absorption capacity, extrustion capability and tendency to form a single phase system.

If a viscosity of 50 cP is reached during the enzymatic modification of the corn gluten, a satisfactory product is obtained. The viscosity has been measured during the hydrolysis in several specific reactions.

The following examples further illustrate practice of the present invention. As is apparent from the examples, the functional properties of the finished products depend strongly on the nature of the enzyme and on the hydrolysis parameters, such as enzyme and substrate concentration, pH and temperature. In the first four examples the viscosity is measured on a Brookfield viscosimeter (which is not an unambiguously reproducible way of measuring the viscosity. In example 5 the viscosity is measured on a HAAKEROTAVISCO viscosimeter with the measuring head MV II, whereby a rotational velocity of 486 rev./minute corresponds to a shear rate of 441 sec$^{-1}$. This apparatus provides true viscosity measurements, even with non-Newtonian fluids. Example 5 is a comprehensive example. Also, example 5 encompasses some comparison experiments illustrative of corn gluten modification under conditions outside the scope of the invention.

EXAMPLE 1

Approximately 150 g maize protein concentrate from Miles Laboratories, Inc., containing approximately 68% protein (N × 6.25) was treated with NEUTRASE ® under the following conditions:
Substrate ... 8% w/w protein in aqueous suspension
Enzyme concentration ... 0.2% of substrate protein (corresp. to 0,24 Anson units/l)
pH (approx.) ... 8
Temperature ... 50° C After 2 hours treatment, a uniform, thick paste was obtained. Investigations on the Brookfield viscosimeter showed that the paste was pseudoplastic in its rheological behavior. The paste did not separate into two phases under the influence of gravity. The taste was pleasant, bland and without any bitter taste.

EXAMPLE 2

The same conditions as used in Example 1 were used, except that the enzyme concentration was 0.1%, corresp. to 0.12 Anson units/l. After approximately 2 hours treatment (hydrolysis), a product with similar characteristics was obtained. The product was heat-inactivated, neutralised and vacuum-dried. The dry powder was able to rehydrate completely to yield a protein suspension with functional properties identical to the properties observed before drying.

EXAMPLE 3

The same conditions as used in EXAMPLE 1 were used, except that the enzyme concentration was 0.4%, corresp. to 0.48 Anson units/l. After 2-2 ½ hours treatment (hydrolysis), a viscous and highly thixotropic suspension was obtained. The suspension did not separate under gravity. It is remarkable that the rheological properties can be changed to such an extent by changing the hydrolysis parameter. Due to a somewhat bitter taste the utility of this product was less satisfactory than the utility of similar products produced with enzyme concentrations not as close to the upper limit as the enzyme concentration used in this example.

EXAMPLE 4

Maize protein concentrate was hydrolysed with ALCALASE ® under the conditions below:
Substrate ... 8% w/w protein in aqueous suspension
Enzyme concentration ... 0.4% of substrate protein
pH ... 8.0
Temperature ... 50° C After 60 minutes treatment (hydrolysis) a thixotropic suspension was obtained. The apparent viscosity, as measured by the time required to empty a 10 ml pipette filled with the suspension, reached a maximum about 15 times higher than water after 90 minutes. After 180 minutes, the apparent viscosity had decreased to about half this value.

EXAMPLE 5

Several hydrolyses of corn gluten were carried out in accordance with the following table. All experiments were run at 50° C.

| No. | % protein | Enzyme kind | % of protein | pH | remarks | Final viscosity, cP | FIG. |
|---|---|---|---|---|---|---|---|
| 1 | 6 | SP 99 | 0,1 | 7,00 | outside inv. | 21 | 1 |
| 2 | 8 | SP 99 | 0,1 | 8,00 | | 164 | 5,3 |
| 3 | 8 | SP 99 | 0,1 | 7,00 | | 148 | 1,7, 5,3 |
| 4 | 8 | SP 99 | 0,1 | 6,45 | | 78 | 5,3 |
| 5 | 8 | Neutrase | 0,1 | 8,00 | | 138 | 4 |
| 6 | 8 | Neutrase | 0,1 | 7,00 | | 148 | 4 |
| 7 | 8 | Neutrase | 0,1 | 6,45 | | 131 | 4 |
| 8 | 8 | SP 99 | 0,2 | 7,00 | | 107 | 7 |
| 9 | 8 | SP 99 | 0,05 | 7,00 | | 92 | 7 |
| 10 | 8 | SP 99 | 0,1 | 8,00 | pH stat, outside inv. | 27 | 5 |
| 11 | 8 | Neutrase | 0,1 | 8,00 | pH stat | 156 | 4 |
| 12 | 8 | SP 99 | 0,1 | 7,00 | pH stat | 107 | 5 |
| 13 | 8 | SP 99 | 0,1 | 7,50 | | 139 | |
| 14 | 8 | Alcalase | 0,1 | 8,00 | pH stat | 140 | 6 |
| 15 | 8 | SP 99 | 0,1 | 8,00 | for dilution | | 2 |
| 16 | 8 | Alcalase | 0,1 | 9,00 | pH stat | 105 | 6,8 |
| 17 | 8 | Alcalase | 0,05 | 9,00 | pH stat | 185 | 8 |
| 18 | 8 | Alcalase | 0,4 | 9,00 | pH stat | 98 | 8 |
| 19 | 8 | Alcalase | 0,1 | 9,00 | | 125 | 6 |

The viscosity was measured with a HAAKE-ROTAVISKO viscosimeter, and in all instances the viscosity was measured on an aqueous suspension with a 6.0% w/w concentration of dry protein, calculated as N × 6.25. The concentration of 6% w/w is obtained by diluting the sample (with a substrate concentration higher than 6% w/w) with the proper amount of distilled water.

For further understanding of the practice of this invention, reference is now made to the drawings wherein FIGS. 1 through 8 are graphic representations of tests carried out on the corn gluten modified according to the preceding examples. When test numbers are indicated, they are the test number of Example 5.

FIG. 1 shows the influence of substrate concentration on viscosity and indicates that a substrate concentration of 6% w/w does not give rise to a viscosity above 50 cP. The substrate concentration of test number 1 is outside the scope of the invention. The other curve on FIG. 1, which is test number 3 (inside the scope of the invention), shows the change of viscosity during hydrolysis when the substrate concentration is 8% w/w, whereby the viscosity after 300 minutes equaled 148 cP.

FIG. 2 shows the influence of the substrate concentration on viscosity at different shear rates. The suspension with highest viscosity is the fully-treated 8% suspension treated in accordance with test No. 15 in Example 5. All other suspensions were prepared from this 8% suspension by dilution. It appears from the curve array that the curves above a substrate concentration of 5% w/w are approximately linear and parallel when plotted on a semilogarithmic graph.

Figure 1:
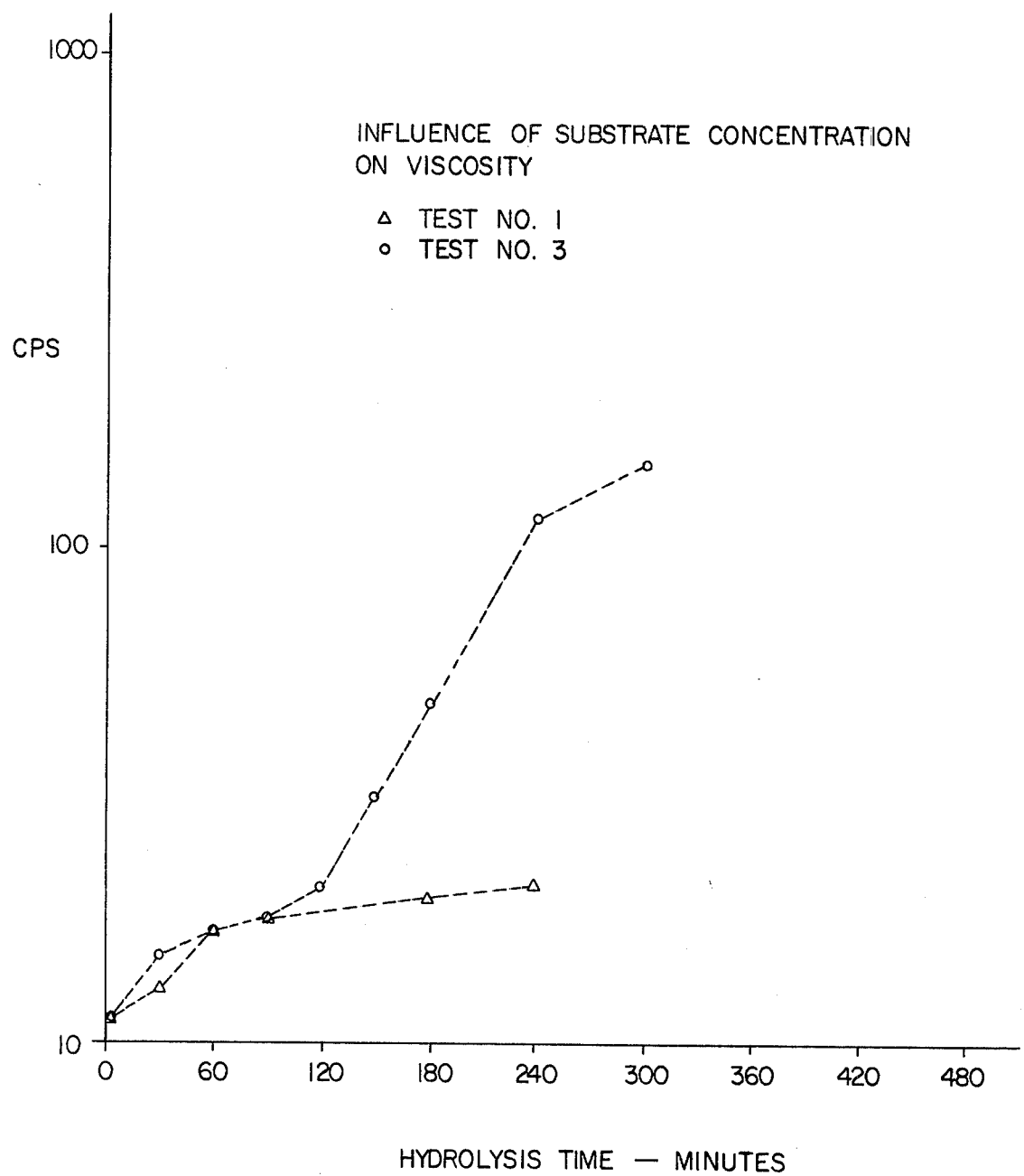
Figure 2:
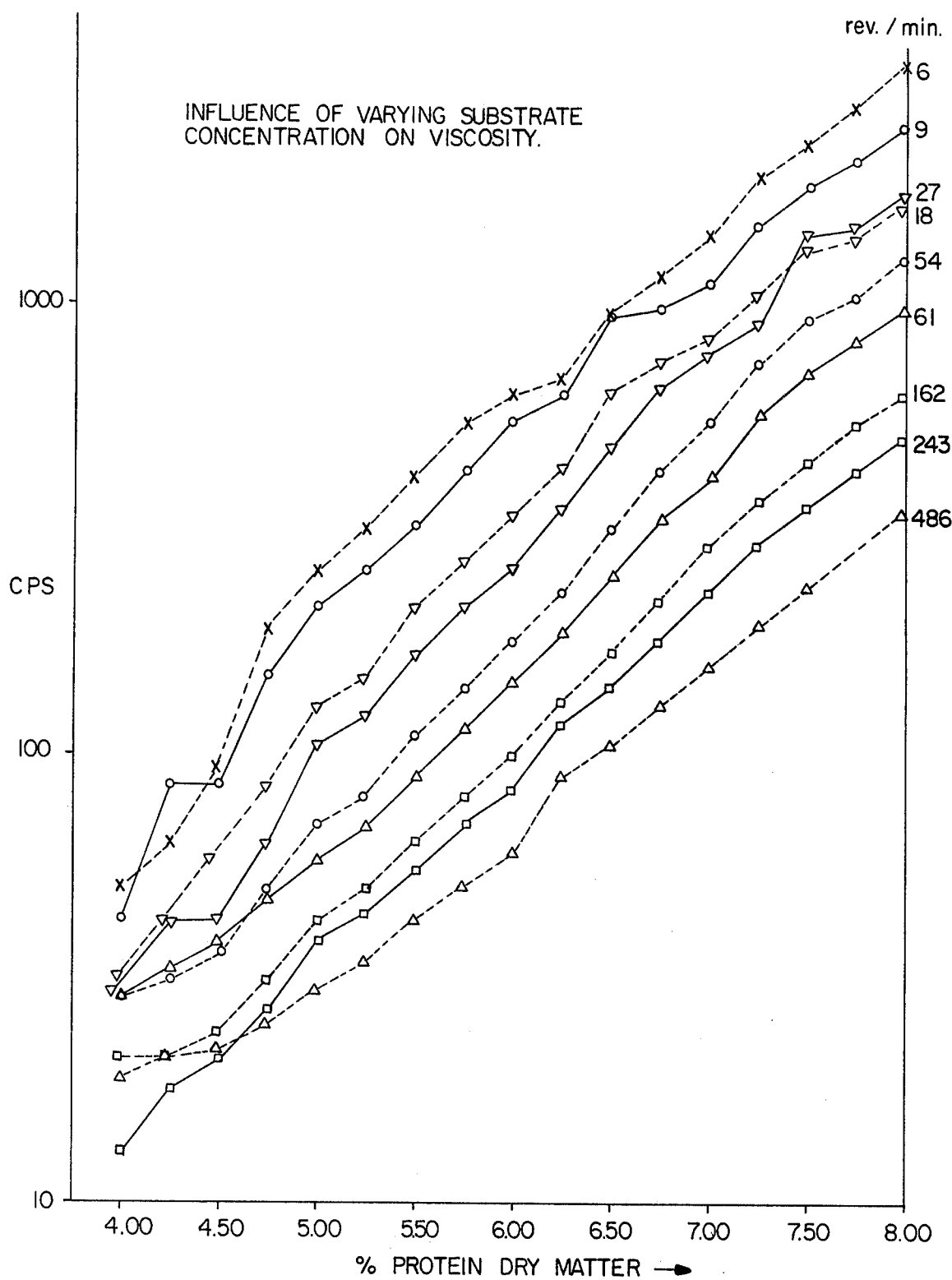
Figure 3:
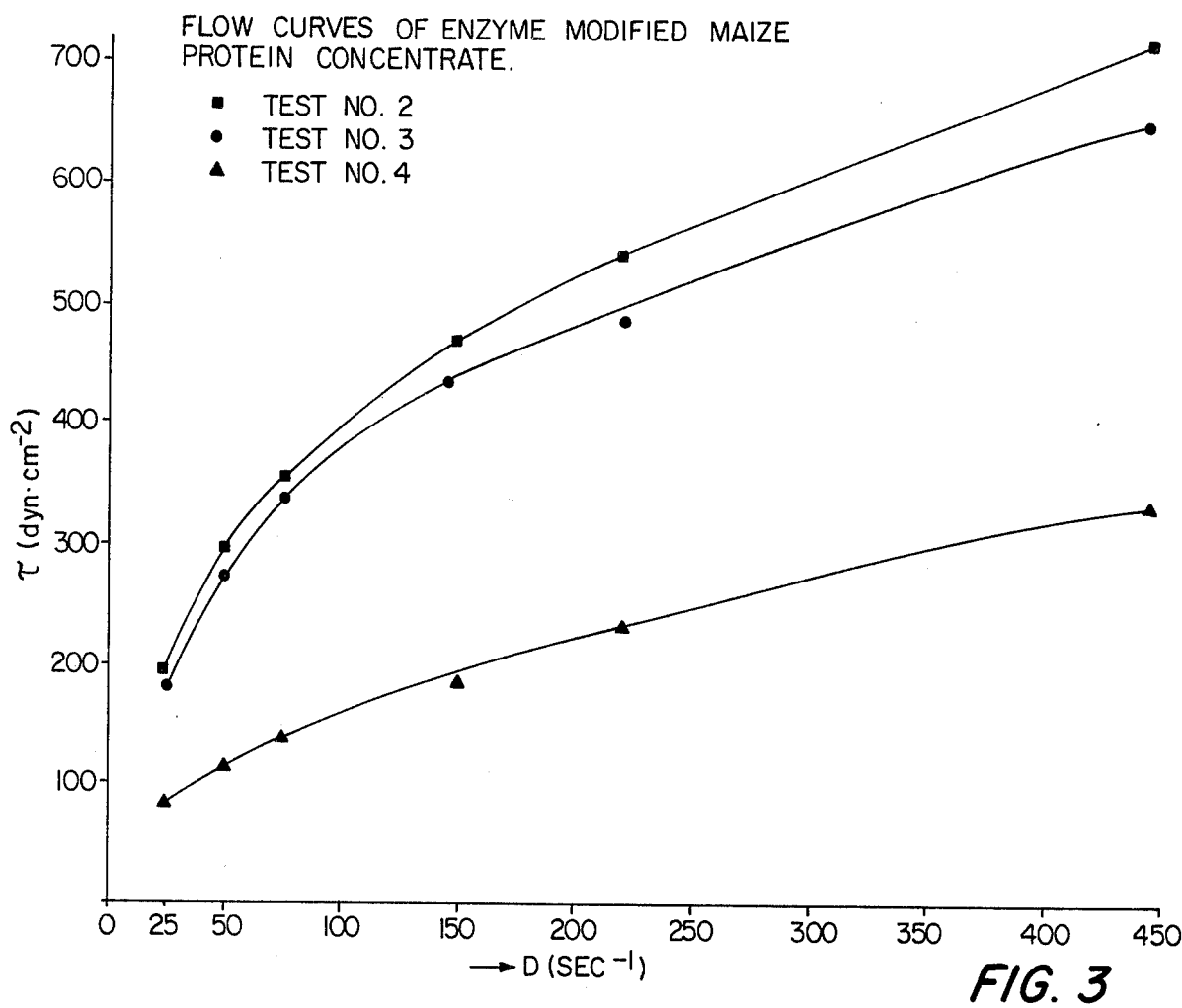
FIG. 3 shows the flow curves for three different pH values indicating the pseudo-plastic character of the suspension. The flow curves are in all three cases plotted when the viscosity has reached its maximum (after a hydrolysis time of about 300-360 minutes).
Figure 4:
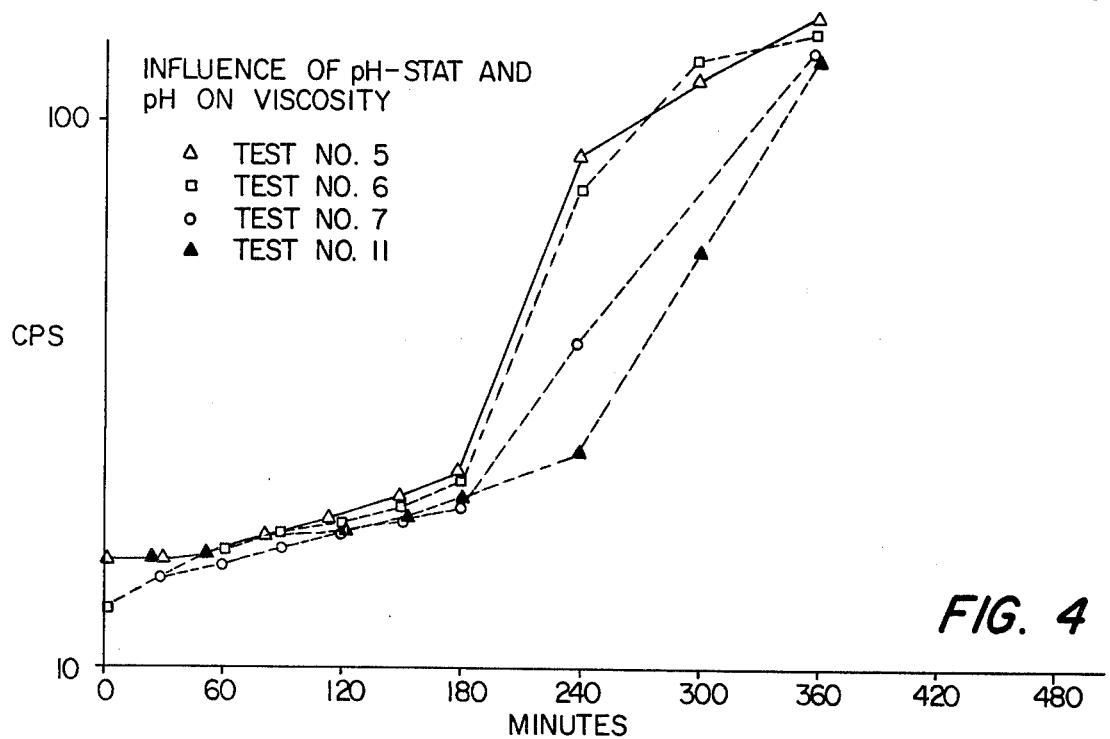
FIG. 4 shows the influence of pH and the influence of the presence or absence of a pH-stat when NEUTRASE ® is used as the proteolytic enzyme. The hydrolysis has a somewhat higher rate with the pH stat than without, but essentially the same final viscosity value is reached.
Figure 5:
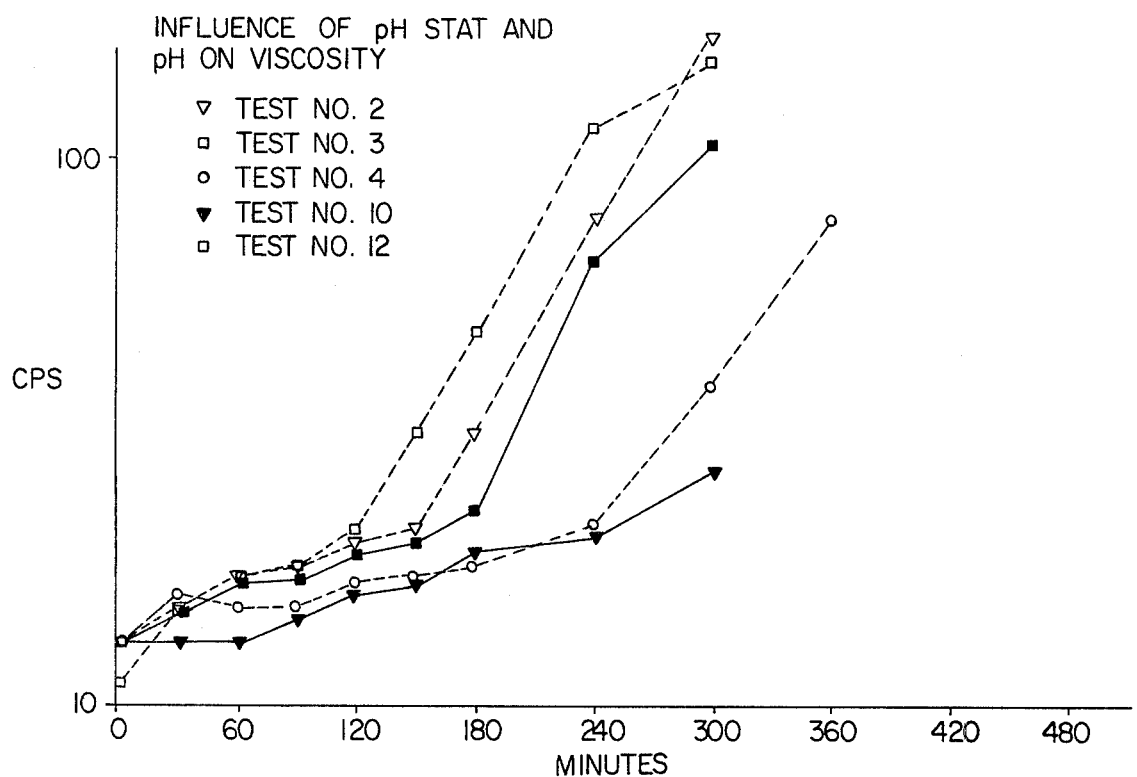

FIG. 5 is a plot similar to the plot in FIG. 4, but SP 99 is used as the proteolytic enzyme. pH 8 appears to be too high for this enzyme as the curve for pH 8 with pH stat shows a relatively little increase of viscosity, whereas the curve with initial pH 8 without pH stat (where pH during hydrolysis drops to a final value of 6.8–7.0) shows a satisfactory viscosity increase. The experiments at pH 7.0 both with and without pH stat exhibit satisfactory viscosity increases.

Figure 6:
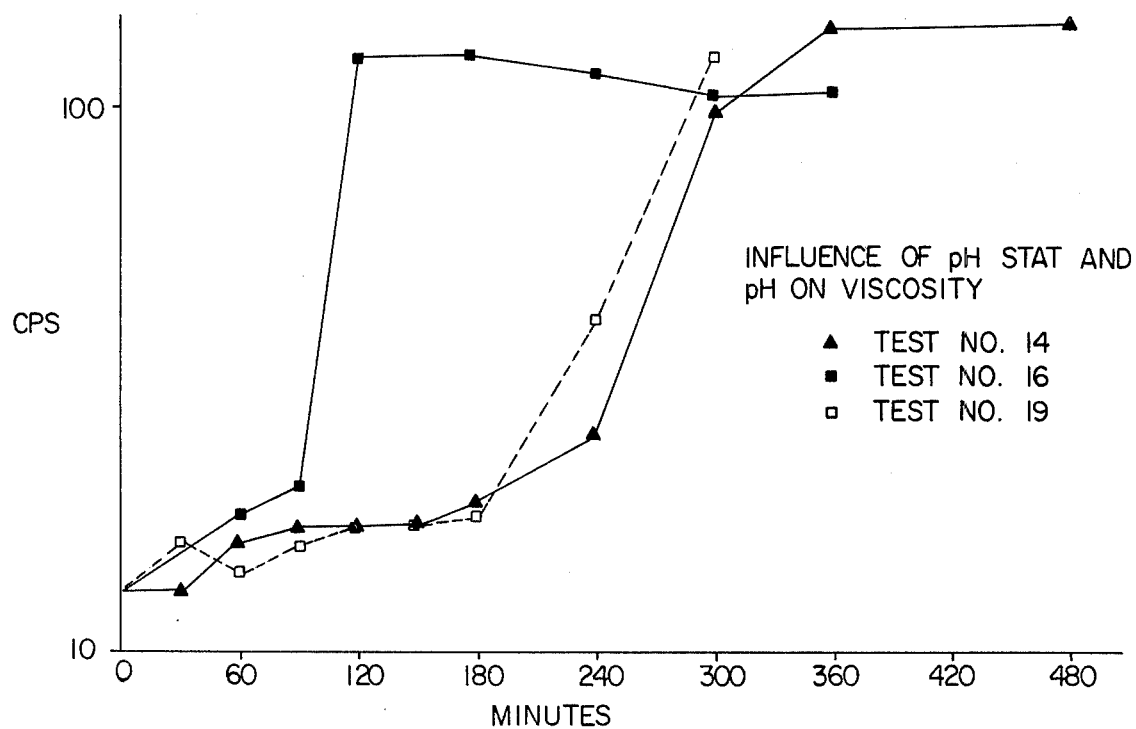

FIG. 6 is a plot similar to the plots in FIG. 4 and 5, but ALCALASE ® is used as the proteolytic enzyme. The test at pH 9 with pH stat gives rise to a very rapid viscosity increase, whereas at pH 9 without pH stat and at pH 8 with pH stat gives rise to a somewhat slower viscosity increase and to curves, which are rather similar, probably due to the pH drop during hydrolysis from the initial pH 9.

Figure 7:
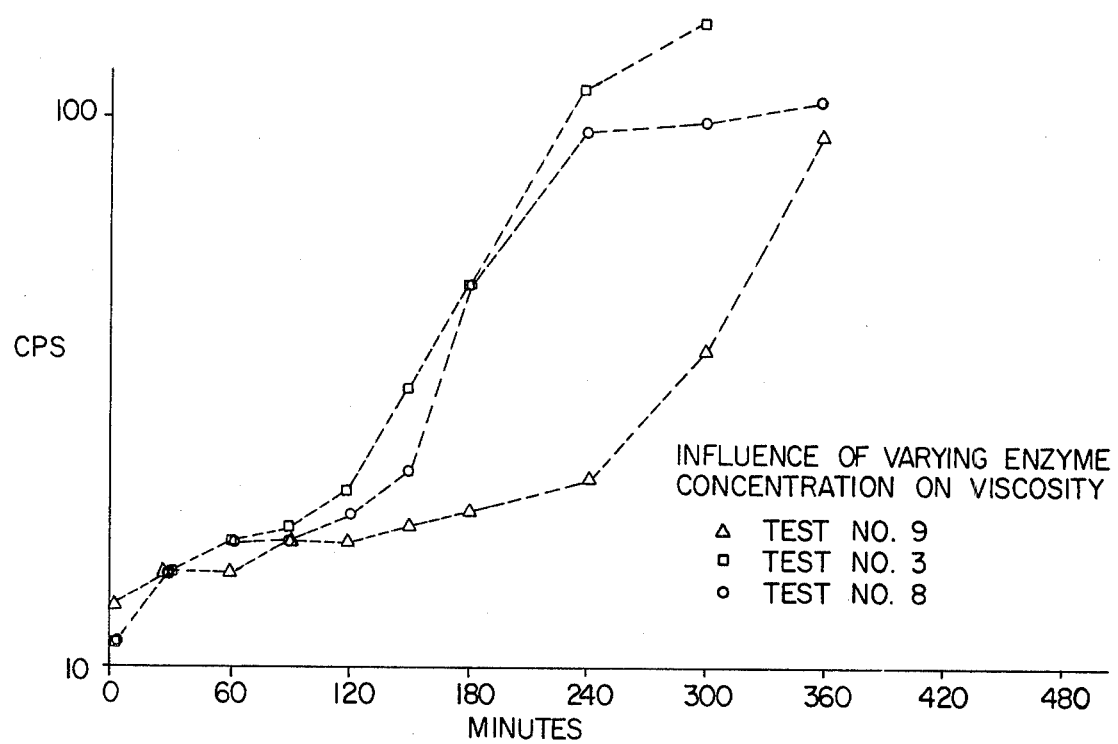

FIG. 7 shows the influence of varying enzyme concentrations on viscosity whereby SP 99 is used as the enzyme. The curve corresponding to the experiments with 0.05% enzyme shows that the viscosity increase is very small during the first couple of hours, whereas the viscosity increases more rapidly during the final stages of hydrolysis. Also, FIG. 7 shows that 0.1% enzyme gives rise to a higer final viscosity than 0.2% enzyme. Possibly the higher enzyme concentration performs a more thorough hydrolysis to low molecular weight peptides.

Figure 8:
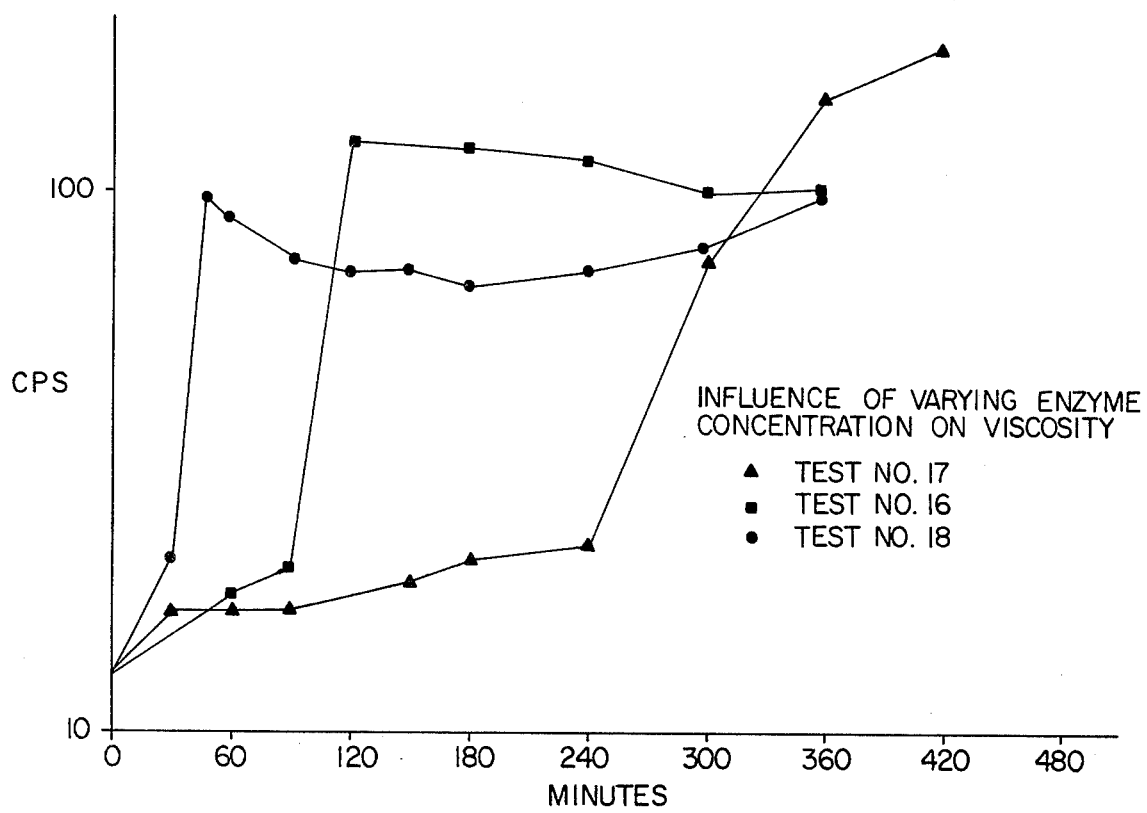

FIG. 8 is a plot similar to the plot in FIG. 7, but ALCALASE ® is used as the enzyme. A trend similar to the trend in FIG. 7 is observed. It appears from the curves that the smallest enzyme concentration gives rise to the highest final viscosity; thus the smallest enzyme concentration is preferred in this case. Also, the products treated with the small enzyme concentration exhibit the best taste, whereas the taste of the products treated with the highest enzyme concentration was somewhat bitter.

What is claimed:

1. The process for modifying corn gluten by proteolytic treatment which comprises reacting an aqueous corn gluten suspension containing above about 6% w/w of protein with a proteolytic enzyme in a concentration between about 0.05 Anson units/l and about 0.5 Anson units/l until the viscosity of the suspension exceeds about 50 cP and thereafter deactivating the enzyme.

2. The process for modifying corn gluten by proteolytic treatment according to claim 1 wherein the proteolytic enzyme is a microbial proteinase.

3. The process for modifying corn gluten by proteolytic treatment according to claim 2, wherein the microbial proteinase exhibits a pH optimum around neutrality.

4. The process for modifying corn gluten by proteolytic treatment according to claim 1, which comprises hydrolyzing until the viscosity exceeds about 100 cP.

5. The process for modifying corn gluten by proteolytic treatment according to claim 1, wherein inactivation of the enzyme is performed by heat treatment.

6. The process for modifying corn gluten by proteolytic treatment according to claim 2, which comprises the use of a proteinase for *B. licheniformis* or *B. subtilis*.

7. The process for modifying corn gluten by proteolytic treatment according to claim 1, comprising the use of a proteolytic enzyme in a concentration in the range of from 0.1 Anson units/l to 0.3 Anson units/l, and at a temperature in the range of from 5° C below the temperature optimum to the temperature optimum for the enzyme.

8. Corn gluten modified by proteolytic treatment in an aqueous suspension contaning above about 6% w/w of protein with from 0.5 - 0.5 Anson units/l of proteinase until the viscosity exceeds about 50 cP.

* * * * *